O. BOYER.
SEPARATOR ATTACHMENT FOR CORN HUSKING MACHINES.
APPLICATION FILED AUG. 30, 1906.
926,464.
Patented June 29, 1909.
2 SHEETS—SHEET 1.
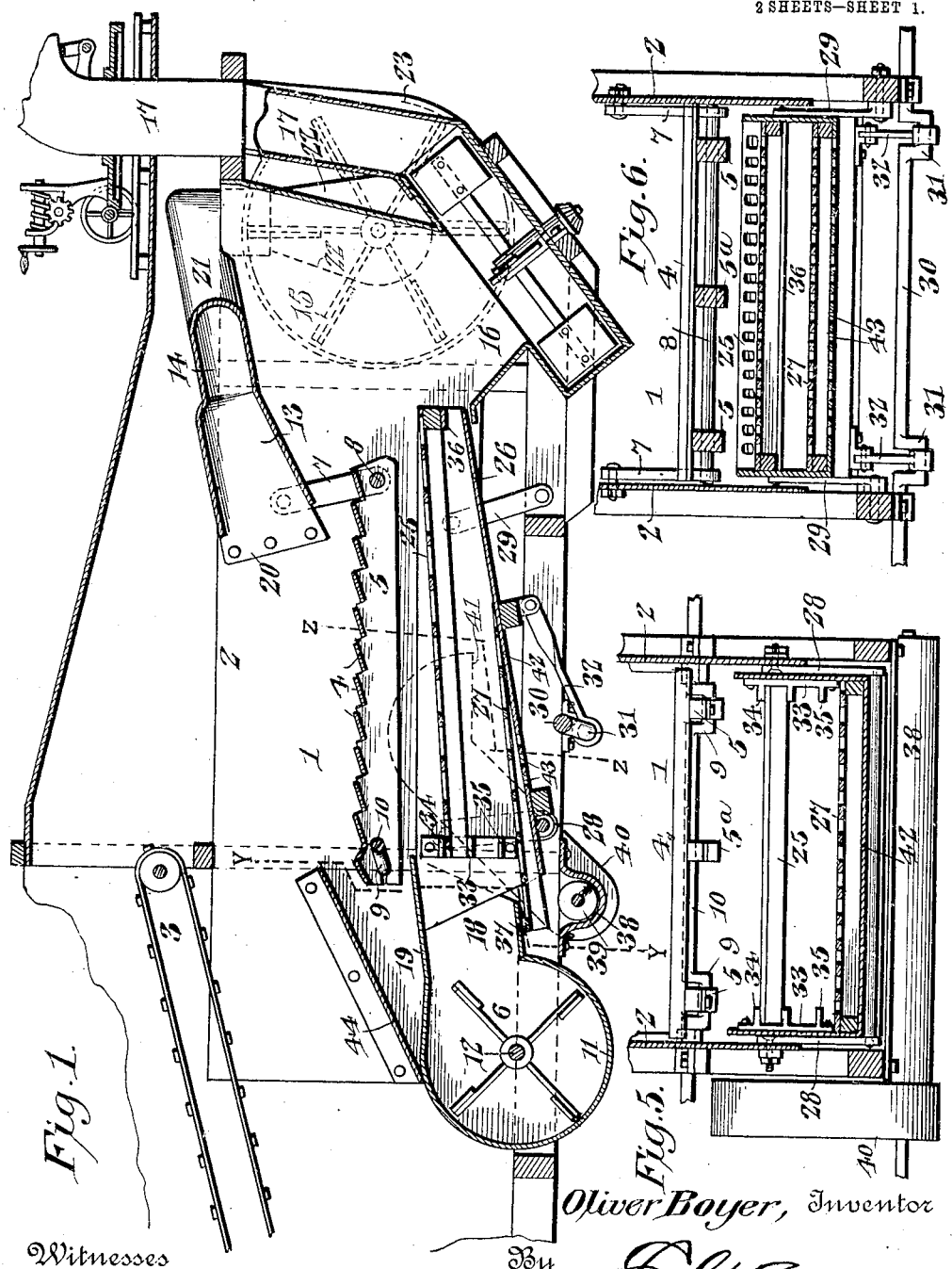
Witnesses
Jas. F. McCathran
W. F. Riley
Oliver Boyer, Inventor
By C. G. Siggers
Attorney

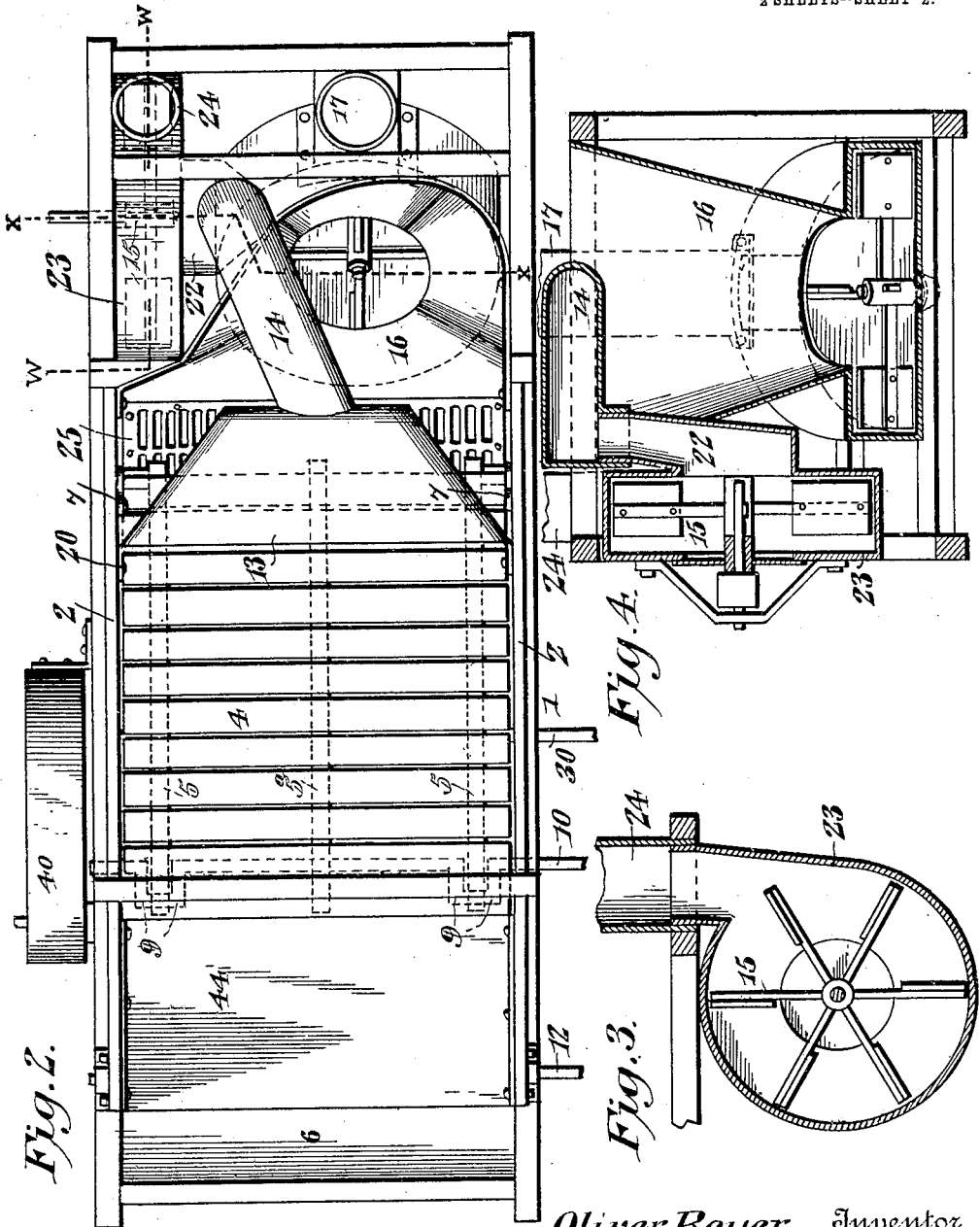

UNITED STATES PATENT OFFICE.

OLIVER BOYER, OF SPENCERVILLE, OHIO.

SEPARATOR ATTACHMENT FOR CORN-HUSKING MACHINES.

No. 926,464.　　　Specification of Letters Patent.　　　Patented June 29, 1909.

Application filed August 30, 1906. Serial No. 332,659.

*To all whom it may concern:*

Be it known that I, OLIVER BOYER, a citizen of the United States, residing at Spencerville, in the county of Allen and State of Ohio, have invented a new and useful Separator Attachment for Corn - Husking Machines, of which the following is a specification.

The invention relates to a separator attachment for corn husking machines.

The object of the present invention is to improve the construction of corn husking machines, and to provide a simple and comparatively inexpensive means, adapted to operate on the fodder, after the same leaves the husking and shredding mechanism, for separating the husks and the blades from the shredded stalks, and for discharging such separated fodder at different points.

A further object of the invention is to provide means for also separating the shelled corn from the fodder and for cleaning the corn before it is bagged.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a longitudinal sectional view of a portion of a corn husking machine, constructed in accordance with this invention. Fig. 2 is a plan view of the same. Fig. 3 is a sectional view taken on the line *w—w* of Fig. 2. Fig. 4 is a transverse sectional view on the line *x—x* of Fig. 2. Fig. 5 is a similar view on the line *y—y* of Fig. 1. Fig. 6 is a transverse sectional view on the line *z—z* of Fig. 1.

Like numerals of reference designate corresponding parts in all the figures of the drawings.

1 designates a reciprocatory shaker and carrier, arranged within a frame 2 of a corn husking machine in rear of and below a fodder carrier 3, which delivers the husks, blades and stalks from the husking and shredding mechanism (not shown) to the shaker and carrier 1. The reciprocatory carrier consists of spaced transverse slats or bars 4, set at an inclination and mounted in recesses of longitudinal side bars 5 and an intermediate longitudinal bar $5^a$. The inclined slats or bars form shoulders at their upper edges for engaging and conveying the fodder rearwardly, and they provide intervening spaces or openings through which passes a blast of air from a fan 6. The carrier 1 is hung at its rear end from the sides of the frame of the machine by means of links 7, pivotally connected at their upper ends to the frame of the machine, and secured at their lower ends to the terminals of a transverse rod or pivot 8. The front ends of the side bars of the carrier 1 are connected with cranks 9 of a transverse shaft 10, which, when rotated, imparts a reciprocatory motion to the carrier.

The blast fan 6 operates within a suitable casing 11, and is mounted on a fan shaft 12, and is adapted to drive a blast or current of air through the carrier 1 to assist in separating the husks and blades from the shredded stalks, the husks and blades being blown by such blast or current of air into a laterally enlarged rearwardly tapered mouth or inlet 13 of an air trunk 14, which is connected with and forms an air intake for a suction fan 15. The blast fan, which is located in advance of the carrier, and the suction fan, which is located in rear of the said carrier, effect a complete separation of the husks and blades from the shredded stalks, and the latter are discharged at the rear end of the carrier 1 and fall into a hopper 16 of a pneumatic conveyer 17, which delivers the shredded stalks at the desired point. Instead of employing a pneumatic conveyer 17, any other form of conveyer may be used for conveying the shredded stalks.

The outlet or discharge opening 18 of the blast fan is located beneath the carrier 1 and extends entirely across the machine, and the upper wall 19 of the mouth of the discharge is set at a slight inclination to direct the current or blast of air from the fan 6 upwardly and rearwardly through the carrier 1. The inlet or mouth 13 of the air trunk is suitably secured at its end walls 20 to the sides of the husking machine at points above the rear end portion of the carrier 1, and the air trunk 14, which consists of an elbow, has an upwardly and rearwardly inclined arm or portion 21 and a depending arm or portion 22, which extends downwardly from the rear end of the arm or portion 21, and which is connected at its lower end with the suction fan casing 23 at the inner side thereof. By the blast and suction means the husks and blades are separated from the stalks, and pass through the air trunk 14 and through the fan casing 23, and are carried away through the chute or conduit 24 of a pneumatic conveyer. The suction fan of the air trunk 14 operates as a driving or blast fan for forcing the separated blades and husks through the pneumatic conveyer chute or conduit 24.

The fan may be operated by any suitable arrangement of gearing, and the chutes or conduits of the pneumatic conveyers may extend to any desired points and may be adjusted by any suitable means, and as such gearing and adjusting means do not constitute any portion of the present invention, a detail description and illustration thereof is deemed unnecessary.

The shelled corn dropping from the carrier 1 falls upon an upper screen or riddle 25 of a shaking shoe 26, which is also provided with a lower screen or riddle 27. The shaking shoe is supported at its front and rear portions by means of front and rear side links 28 and 29. The front links 28 are pivoted at their upper end to the sides of the frame of the machine and are connected at their lower ends to the shaking shoe, and the rear links, which are pivoted at their upper ends to the shaking shoe, are connected at their lower ends with the frame of the machine. The shaking shoe is vibrated by means of a transversely disposed shaft 30, journaled in suitable bearings to the frame of the machine, and provided at opposite sides with cranks 31, which are connected by rods 32 with the sides of the shaking shoe.

The upper screen or riddle inclines downwardly and forwardly, and its front end is adjustably mounted on side brackets 33, having upper and lower supports 34 and 35, which enables the front end of the said screen or riddle 25 to be arranged at different elevations. The front brackets 33 consist of vertical plates, which are provided with upper, lower and intermediate projecting flanges to form the said seats. The rear end of the upper screen or riddle is detachably supported by suitable brackets 36.

The lower screen or riddle 27 extends downwardly and forwardly from the upper screen or riddle, and its front end is located beneath the bottom wall 37 of the discharge or outlet of the casing 11 of the blast fan 6. The front portion of the said lower screen or riddle also extends over the transverse conveyer casing 38, which receives a screw conveyer 39 for carrying the shelled corn across the frame of the machine to the short elevator 40. The elevator 40 is provided with an upper discharge end 41, which is adapted for delivering the shelled corn into bags, or other suitable receptacles. The shelled corn is thoroughly cleaned by the upper and lower riddles of the shaking shoe, and light impurities are blown from the corn by the air from the blast fan, which is located in advance of the shaking shoe. The bottom 42 of the shaking shoe is provided at its lower portion with perforations 43, forming a screen and adapted to cause the dust and dirt to be discharged before reaching the transverse conveyer.

A transverse shield or plate 44, which is arranged at an inclination in advance of the carrier 1, is secured to the sides of the frame of the machine. The inclined plate or shield is preferably constructed of sheet metal, and its rear end extends slightly above the said carrier 1, and it is adapted to prevent the material from accidentally dropping in advance of and getting beyond the means for separating the husks and blades from the shredded stalks.

Having thus fully described my invention, what I claim as new and desire to secure by Letters Patent, is:—

1. The combination with a reciprocatory shaker and carrier arranged to receive the husks, blades and stalks from a corn husking machine, of means located beneath the carrier for separating the husks and blades from the stalks during the passage of the same along the carrier, means for conveying away the separated husks and blades to one point, and separate means receiving the stalks from the carrier for conveying away the stalks to a different point.

2. In combination with a frame of a corn husking machine, a fodder carrier having its discharge end located at one end of the said frame and at the top thereof to deliver thereto the husks, blades and stalks from the corn husking machine, a reciprocatory shaker and carrier arranged within the frame below the upper end thereof, said frame constituting side walls for the said shaker and carrier, an inclined inlet located at the end of the shaker and carrier opposite the fodder carrier and extending transversely across the shaker and carrier between the side walls of the frame, said inlet being spaced above the shaker and carrier to provide a passage for the stalks between the inlet and the said shaker and carrier, means for creating a suction through the inlet to separate the blades and husks from the stalks during the passage of the material over the shaker and carrier, said inlet delivering the husks and blades to one point, a hopper arranged below the inlet and below the shaker and carrier and at the same end of the latter as the inlet so as to receive the stalks falling from the shaker and carrier, and means for delivering the stalks to a different point.

3. The combination of a reciprocatory shaker and carrier arranged to receive the husks, blades and stalks from a corn husking machine, an inlet for the husks and blades extending transversely across the shaker and carrier and located above and spaced from the same at the rear end thereof to provide a passage for the stalks beneath the inlet, a suction device for creating a suction through the inlet, a blast device arranged below the shaker and carrier at the front thereof for driving the husks and blades toward the inlet, a separate hopper arranged to receive the stalks delivered from the shaker and carrier, and means for carrying away the stalks.

4. The combination of a reciprocatory shaker and carrier arranged to receive the husks, blades and stalks from a corn husking machine, an inlet for the husks and blades extending across the shaker and carrier and located above and spaced from the same at the rear end thereof to provide a passage for the stalks, a suction device for creating a suction through the inlet, a blast device located below the shaker and carrier at the front thereof for driving the husks and blades toward the inlet, a separate hopper arranged to receive the stalks delivered from the shaker and carrier, and a blast device for driving away the stalks received in the said hopper.

5. The combination of a reciprocatory shaker and carrier arranged to receive the husks, blades and stalks from a corn husking machine, means for separating the husks and blades from the stalks, said means embodying a suction fan having an intake located at the rear portion of and above the shaker and carrier and spaced from the same to provide a passage for the stalks, and a blast fan having its discharge or outlet at the front of the shaker and carrier to drive the husks and blades toward the suction device.

6. In combination with a reciprocatory shaker and carrier, a fodder carrier arranged at one end thereof to deliver thereto the husks, blades and stalks from a corn husking machine, an inlet located at the other end of the reciprocatory shaker and carrier and extending transversely across the same and spaced above the shaker and carrier to provide a passage for the stalks between the inlet and the said shaker and carrier, means for creating a suction through the inlet to separate the blades and husks from the stalks during the passage of the material over the shaker and carrier, said inlet delivering the husks and blades to one point, and separate means located in a lower plane than the inlet to catch the stalks falling from the carrier and deliver them to a different point.

7. In combination with a reciprocatory shaker and carrier provided at intervals with openings, a fodder carrier arranged at one end of the reciprocatory shaker and carrier to deliver thereto the husks, blades and stalks from a corn husking machine, an inlet located at the other end of the shaker and carrier and extending transversely across the same and spaced above the shaker and carrier to provide a passage for the stalks between the inlet and the said shaker and carrier, means for creating a suction through the inlet to separate the blades and husks from the stalks during the passage of the material over the shaker and carrier, said inlet delivering the husks and blades to one point, separate means located in a lower plane than the inlet to catch the stalks falling from the shaker and carrier and deliver them to a different point, and means located at the front of the shaker and carrier and below the same for producing a blast of air to drive the husks and blades toward the inlet.

8. In combination with a reciprocatory shaker and carrier provided at intervals with openings, a fodder carrier arranged at one end of the reciprocatory shaker and carrier to deliver thereto the husks, blades and stalks from a corn husking machine, an inlet located at the other end of the shaker and carrier and extending transversely across the same and spaced above the shaker and carrier to provide a passage for the stalks between the inlet and the said shaker and carrier, means for creating a suction through the inlet to separate the blades and husks from the stalks during the passage of the material over the shaker and carrier, said inlet delivering the husks and blades to one point, separate means located in a lower plane than the inlet to catch the stalks falling from the shaker and carrier and deliver them to a different point, means located at the front of the shaker and carrier and below the same for producing a blast of air to drive the husks and blades toward the inlet, and a shield located at the front of the shaker and carrier and extending to a point between the same and the fodder carrier.

9. The combination of a reciprocatory shaker and carrier provided at intervals with openings and arranged to receive the husks, blades and stalks from a corn husking machine, a pneumatic conveyer having a fan forming a suction device and provided with a tapered mouth or inlet located at the rear portion of and above the shaker and carrier and arranged to receive the husks and blades, said mouth or entrance being spaced above the shaker and carrier to provide a passage for the stalks beneath the former, a blast fan located below and at the front of the carrier to drive the huks and blades toward the mouth or inlet, and separate stalk conveying means arranged at the rear end of the shaker and carrier.

10. The combination of a reciprocatory shaker and carrier arranged to receive the husks, blades and stalks from a corn husking machine, an inlet for the husks and blades extending transversely across the shaker and carrier and located above and spaced from the rear end thereof to provide a passage for the stalks beneath the inlet, a suction device for creating a suction through the inlet, and separate means for conveying away the stalks passing through the said passage.

11. The combination of a reciprocatory shaker and carrier having openings and arranged to receive the husks, blades and stalks from a corn husking machine, a shaking shoe located beneath the shaker and carrier and arranged to receive the shelled corn, an inlet for the husks and blades extending across the shaker and carrier and located above the rear end thereof and spaced from the same to provide a passage for the stalks beneath the inlet, a suction device for creating a suction through the inlet, and a single fan located in advance of the shoe and at a point below the front end of the shaker and carrier to clean the shelled corn and also to drive the husks and blades toward the inlet.

12. The combination of a shaker and carrier having openings and arranged to receive the husks, blades and stalks from a corn husking machine, a suction device having an inlet for the husks and blades and extending across the shaker and carrier and located above and spaced from the rear end of the same to provide a passage for the stalks beneath the inlet, a hopper arranged to receive the stalks passing through the said passage, means for conveying the stalks away from the hopper, a shaking shoe located beneath the shaker and carrier and arranged to receive the shelled corn, and a fan located in advance of the shaking shoe and arranged below the shaker and carrier to clean the shelled corn and to drive the husks and blades toward the inlet 13. In combination with a frame of a corn husking machine, a fodder carrier having its discharge end located at one end of the said frame and at the top thereof to deliver thereto the husks, blades and stalks from the corn husking machine, a reciprocatory shaker and carrier provided at intervals with openings and arranged within the frame below the upper end thereof, said frame constituting side walls for the said shaker and carrier, an inclined inlet located at the end of the shaker and carrier opposite the fodder carrier and extending transversely across the shaker and carrier between the side walls of the frame, said inlet being spaced above the shaker and carrier to provide a passage for the stalks between the inlet and the said shaker and carrier, means for creating a suction through the inlet to separate the blades and husks from the stalks during the passage of the material over the shaker and carrier, said inlet delivering the husks and blades to one point, a hopper arranged below the inlet and below the shaker and carrier and at the same end of the latter as the inlet so as to receive the stalks falling from the shaker and carrier, pneumatic means for delivering the stalks to a different point, and separate means located at the front of the shaker and carrier and below the same for producing a blast of air so as to drive the husks and blades toward the mouth of the inlet.

In testimony, that I claim the foregoing as my own, I have hereto affixed my signature in the presence of two witnesses.

OLIVER BOYER.

Witnesses:
CHRISTOPHER LOUTH,
IRA B. CASS.